United States Patent [19]

Macey et al.

[11] Patent Number: 4,833,109

[45] Date of Patent: May 23, 1989

[54] LOW THERMAL CONDUCTIVITY MAGNESITE-SPINEL BRICK AND METHOD

[75] Inventors: Christopher L. Macey, Pittsburgh; Richard J. Knauss, Clairton, both of Pa.

[73] Assignee: Dressers Industries, Inc., Dallas, Tex.

[21] Appl. No.: 144,241

[22] Filed: Jan. 15, 1988

[51] Int. Cl.$^4$ .............................................. C04B 35/44
[52] U.S. Cl. ..................................... 501/120; 501/80; 501/109; 501/119
[58] Field of Search ................ 501/109, 120, 119, 80

[56] References Cited

U.S. PATENT DOCUMENTS

| | | | |
|---|---|---|---|
| 3,577,247 | 5/1971 | McKenna | 501/120 |
| 4,126,479 | 11/1978 | Videtto | 501/120 |
| 4,248,752 | 2/1981 | Myles | 501/727 |
| 4,432,799 | 2/1984 | Salazar | 501/111 |
| 4,440,865 | 4/1984 | Salazar | 501/127 |
| 4,623,131 | 11/1986 | Roberts | 266/286 |
| 4,703,022 | 10/1987 | Johnson | 501/120 |
| 4,729,974 | 3/1988 | Nazirizadeh et al. | 501/120 |

FOREIGN PATENT DOCUMENTS 928283  4/1961  United Kingdom ................ 501/119

*Primary Examiner*—William R. Dixon, Jr.
*Assistant Examiner*—Karl Group
*Attorney, Agent, or Firm*—Sigalos, Levine & Montgomery

[57] ABSTRACT

A refractory mix for forming low thermal conductivity refractory shapes comprising about 50 to 90% by weight of magnesite, about 10 to 50% by weight spinel or about 7 to 35% by weight of an alumina-bearing material, and about 1 to 10% by weight of a nonsiliceous void-forming material.

5 Claims, No Drawings

LOW THERMAL CONDUCTIVITY MAGNESITE-SPINEL BRICK AND METHOD

BACKGROUND OF THE INVENTION

The present invention relates to a low thermal conductivity magnesite-spinel refractory shape and particularly brick suitable for use in cement kiln operations.

Magnesite-spinel brick are now commonly used in rotary cement kilns and such use has increased in recent years since the federal government has classified soluble chrome as a hazardous material. For many years prior to that time, magnesite-chrome brick provided excellent service and were extensively used throughout the rotary kiln industry. However it was found that chrome in such brick can react with alkali in the rotary kiln environment to form a soluble form of chrome known as hexavalent chrome. Such chrome was a potentially hazardous material and, thus, a used magnesite-chrome lining was classified accordingly and had to be disposed of as a potentially hazardous material which placed a large financial burden on operators of such kilns.

As a consequence chrome-free brick and in particular magnesite-spinel brick have been attempted to be used in place of such magnesite-chrome brick. However, while these brick have performed somewhat satisfactorily in service, they do not give a performance that matches that available with the magnesite-chrome compositions which replaced. One reason for this is due to the high thermal conductivity of the magnesite-spinel brick. Because of the bricks' higher thermal conductivity they do not insulate as well and therefore heat loss is greater and the brick are less economical.

In most extreme cases, hot spots develop on the outside shell of the kiln from extensive heat loss. As a consequence if such are not eliminated, it can soften the outside shell resulting in structural damage and costly repair. Consequently, the magnesite-spinel brick must be removed in such instances even though it has been found it still retains a relatively high percentage of its original thickness. In other words, the magnesite-spinel refractory lining has not undergone severe chemical or physical erosion, but, rather, the brick are replaced only because their thickness does not allow proper insulation of the outer metallic shell.

Efforts to overcome this problem in order to increase the useful life of the magnesite-spinel brick in these circumstances have not proven satisfactory.

SUMMARY OF THE INVENTION

The present invention overcomes the problems of the prior art and provides low thermal conductivity magnesite-spinel brick refractories, particularly brick, which provide a longer useful life for the brick or, in the alternative, permit the manufacture and use of thinner brick giving the same lining life as the magnesite-spinel brick currently used without the present invention.

Briefly stated, the present invention comprises a refractory mix for forming shaped refractories comprising 50 to 90% by weight magnesite, 10 to 50% by weight spinel, and 1 to 10% by weight of a nonsiliceous void-forming material. As set forth below, the spinel can be formed in situ during firing in forming the refractory and in such instance an alumina-bearing material can be used in place of the spinel in an amount of about 7 to 35% by weight based on the alumina content of such material.

The invention also comprises the resultant refractory shape and the method of making such shape.

DETAILED DESCRIPTION

While the invention is broadly directed to any refractory shape, it will be discussed broadly with respect to the formation of brick, particularly brick for use in the rotary cement kiln industry as linings in rotary kilns.

The essential materials in the instant invention are the magnesite, spinel and the nonsiliceous void-forming material. Combined, these are what give the refractory shape its strength and low thermal conductivity. Other materials conventionally used in making brick can be added for their usual purposes and in their usual amounts, such as binders; with lignosulfonates being an example, for the purpose of holding the brick together in the green state and pressing aids; such as used motor oil, for the purpose of acting as a lubricant between the grains to get higher density.

As to the magnesite, it can be any magnesite conventionally used in forming magnesite-spinel refractory materials. It need not be a magnesite of high purity, and while magnesite containing 98% or more MgO is preferred, magnesites having an MgO content of 85% and above are satisfactory. However, overall, the mix should not contain more than about 3% by weight of silica.

As to the spinel, it can be a sintered or fused-type spinel, or can be formed in situ by adding an alumina grain or any alumina-yielding material, such as bauxite or alumina hydroxide, to the mix.

As to the nonsiliceous void-forming material, it can be any material such as coke, other carbon-containing material, or hollow plastic spheres but preferably is bubble alumina; i.e., hollow alumina spheres. It is only necessary in the case of the solid materials that they are consumed during the firing of the brick but at a rate such that they leave voids in the brick. In the case of the hollow spheres it is only necessary that they are not consumed during firing at a rate such that the voids they form in the brick in the green state collapse. Bubble alumina is preferred since it can react with the magnesia as noted below to form a spinel.

The solid or hollow void-forming material used should not be too large in size since the resulting large voids in the brick act to lower the strength thereof below acceptable levels. It is preferred to use void-forming material having grain sizes of $-4$ mesh or finer.

As used herein, the term "nonsiliceous" as applied to the void-forming material means containing no more than about 10% silica, it being recognized that materials such as coke, alumina and the like contain some silica.

As to proportions, for each 100% by weight of the mix there is from about 50 to 90% by weight magnesite, 10 to 50% by weight spinel, and 1 to 10% by weight of the nonsiliceous void-forming material.

The mix can be formed by simply mixing the three main components noted; namely, the magnesite, spinel, and the nonsiliceous void-forming material and adding thereto the minor components in their usual proportions and for the usual effects as noted above. The mix is then shaped in the usual manner and fired. In the case of forming brick any conventional brick press and brick-forming pressures can be used. In terms of the solid nonsiliceous void-forming material; such as the coke, the firing temperatures are such that the coke will be consumed leaving behind in the brick a series of voids filled with air. Ordinarily, brick are fired at temperatures ranging from about 2800° to 3100° F. The result is a brick with lower thermal conductivity since air is a good insulator.

In the case of hollow spheres; such as bubble alumina, the addition thereof to the mix adds porosity to the brick by forming a void in the green state. Upon firing of the brick, the temperatures again are such that the outer shell will be consumed and in the case of the bubble alumina grain the outer shell reacts with the free magnesia in the mix system forming a spinel, while leaving intact the voids formed by the bubble. The voids left behind fill with air and, as noted, this air acts as an excellent insulator, thereby lowering the thermal conductivity of the brick.

Levels of void-forming material; such as the bubble alumina, much above 10% are unsatisfactory since the amount of voids formed will result in bricks of inadequate strength; whereas, amounts less than 1% are unsatisfactory in that they do not decrease the thermal conductivity of the brick significantly.

In view of the activity of the bubble alumina, it can be used to form a portion of the spinel. In addition, the spinel itself, as previously noted, can be formed in situ by adding an alumina grain or any alumina-bearing material such as bauxite or alumina hydroxide to the mix. Upon firing of the refractory shape in the green state, the alumina will react with the magnesia to form the spinel. Obviously, the amount of alumina-bearing material added is based upon the alumina content thereof to give the mix the requisite amount of spinel upon firing.

The invention will be further described in connection with the following examples which are set forth for purposes of illustration only.

EXAMPLES 1–3

A series of three mixes were made using a magnesite containing 95% MgO (MAGNESITA M10). The mixes were the same except for their content of bubble alumina with Example 1 containing no bubble alumina, Example 2 containing 3% bubble alumina, and Example 3 containing 5% bubble alumina. These were formed into brick and tested. The results are set forth in Table I below.

TABLE I

|  | Example 1 | Example 2 | Example 3 |
|---|---|---|---|
| Mix: |  |  |  |
| Magnesite |  |  |  |
| −4 + 10 mesh | 11% | 10% | 10% |
| −10 + 28 mesh | 9 | 9 | 9 |
| −28 mesh | 15 | 14 | 14 |
| BMF 70 | 25 | 24 | 24 |
| Fused Spinel (A-72) |  |  |  |
| −6 + 10 mesh | 16 | 16 | 15 |
| −10 + 28 mesh | 14 | 14 | 13 |
| −28 mesh | 10 | 10 | 10 |

TABLE I-continued

|  | Example 1 | Example 2 | Example 3 |
|---|---|---|---|
| Bubble Alumina (−4 mesh) | — | 3 | 5 |
| Plus Additions: |  |  |  |
| Lignosulfonate (Silicanit) |  | 4.00 |  |
| Used Motor Oil |  | 0.50 |  |
| Pressing Pressure, psi: | 15,000 | 15,000 | 15,000 |
| Density at the Press, pcf (Av 2): | 188 | 185 | 184 |
| Burn: | 3050° F.; 10-Hour Hold | | |
| Linear Change on Burning, %: | +0.2 | +0.9 | +0.2 |
| Bulk Density, pcf: | 179 | 173 | 170 |
| Thermal Conductivity (K-Value) Hot Wire Test (BTU-in/ft$^2$-hr-°F. |  |  |  |
| At 510° F.: | 31.8 | — | 21.4 |
| At 760° F.: | 24.6 | — | 20.3 |
| At 1010° F.: | 23.3 | — | 21.0 |
| At 1260° F.: | 24.2 | — | 22.2 |
| At 1510° F.: | 25.7 | — | 21.8 |
| At 1760° F.: | 25.8 | — | 22.2 |

The results show much lower thermal conductivity of brick containing the bubble alumina.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory mix for forming low thermal conductivity brick comprising about 50 to 90% by weight of magnesite, about 10 to 50% by weight spinel or about 7 to 35% by weight of an alumina-bearing material other than spinel and bubble alumina, and about 1 to 10% by weight of a bubble alumina.

2. The refractory mix of claim 1, wherein the bubble alumina has a grain size of −4 mesh and finer.

3. The refractory mix of claim 1 consisting essentially of 50 to 90% by weight of a magnesite containing at least about 98% MgO, 10 to 50% by weight of a sintered or fused spinel, and 1 to 10% by weight of bubble alumina having a grain size of −4 mesh and finer.

4. A method of forming a brick having spinel-lined voids comprising forming a mix comprising about 50 to 90% by weight of magnesite, about 10 to 50% by weight spinel or about 7 to 35% by weight of an alumina-bearing material other than spinel and bubble alumina, and about 1 to 10% by weight of a bubble alumina, pressing the mix into the shape of a brick, and firing the same at a temperature and for a time sufficient to form the brick and cause the outer shell of said bubble alumina to react with said magnesia to form spinel-lined voids.

5. The method of claim 4 wherein the mix consists essentially of 50 to 90% by weight of a magnesite containing at least about 98% MgO, 10 to 50% by weight of a sintered or fused spinel, and 1 to 10% by weight of bubble alumina having a grain size of −4 mesh and finer.

* * * * *